United States Patent
Katranaras et al.

(10) Patent No.: US 11,653,362 B2
(45) Date of Patent: May 16, 2023

(54) RESOURCE ALLOCATION FOR USER EQUIPMENT

(71) Applicant: JRD Communication (SHENZHEN) LTD, Guangdong (CN)

(72) Inventors: Efstathios Katranaras, Guangdong (CN); Benny Assouline, Guangdong (CN); Guang Liu, Guangdong (CN)

(73) Assignee: JRD COMMUNICATION (SHENZHEN) LTD, Guangdong (CN)

( * ) Notice: Subject to any disclaimer, the term of this patent is extended or adjusted under 35 U.S.C. 154(b) by 0 days.

(21) Appl. No.: 16/646,560

(22) PCT Filed: Mar. 21, 2019

(86) PCT No.: PCT/CN2019/079057
§ 371 (c)(1),
(2) Date: Mar. 11, 2020

(87) PCT Pub. No.: WO2019/184793
PCT Pub. Date: Oct. 3, 2019

(65) Prior Publication Data
US 2021/0120578 A1    Apr. 22, 2021

(30) Foreign Application Priority Data
Mar. 29, 2018  (GB) .................................. 1805249

(51) Int. Cl.
*H04W 72/14*      (2009.01)
*H04W 72/04*      (2009.01)
(Continued)

(52) U.S. Cl.
CPC .......... *H04W 72/14* (2013.01); *H04L 1/0061* (2013.01); *H04L 1/1614* (2013.01);
(Continued)

(58) Field of Classification Search
None
See application file for complete search history.

(56) References Cited

U.S. PATENT DOCUMENTS

| | | | |
|---|---|---|---|
| 2018/0035332 A1 | 2/2018 | Agiwal et al. | |
| 2018/0139734 A1* | 5/2018 | Babaei ............. | H04W 72/0406 |
| | | (Continued) | |

FOREIGN PATENT DOCUMENTS

| | | |
|---|---|---|
| CN | 107182081 A | 9/2017 |
| CN | 107493605 A | 12/2017 |
| | (Continued) | |

OTHER PUBLICATIONS

"Remaining aspects of pre-emption indication", CATT, 3GPP TSG RAN WG1 Meeting #91, R1-1720207, Nov. 18, 2017.
(Continued)

*Primary Examiner* — Saba Tsegaye
(74) *Attorney, Agent, or Firm* — PV IP PC; Wei Te Chung; Zhigang Ma

(57) ABSTRACT

Methods for allocating uplink resources between UEs wherein previously allocated uplink resources may be allocated to a further UE and a suspension indication transmitted to the UE to which the resources were previously allocated. The methods including transmitting an indication from a base station to a UE indicating grant of a set of resources for an uplink transmission, and transmitting a DCI including a suspension indication.

4 Claims, 4 Drawing Sheets

(51) Int. Cl.
*H04L 1/16* (2006.01)
*H04L 1/00* (2006.01)
*H04W 76/11* (2018.01)
*H04L 1/1607* (2023.01)
*H04W 72/0453* (2023.01)

(52) U.S. Cl.
CPC ..... *H04W 72/042* (2013.01); *H04W 72/0453* (2013.01); *H04W 76/11* (2018.02)

(56) References Cited

U.S. PATENT DOCUMENTS

| | | | |
|---|---|---|---|
| 2018/0199359 A1* | 7/2018 | Cao | H04W 28/04 |
| 2018/0206214 A1* | 7/2018 | Bendlin | H04W 72/042 |
| 2018/0219649 A1* | 8/2018 | Ying | H04L 1/1819 |
| 2019/0082456 A1* | 3/2019 | Kim | H04L 1/0073 |
| 2019/0090269 A1* | 3/2019 | Cao | H04L 1/1822 |
| 2019/0104517 A1* | 4/2019 | Park | H04W 72/0413 |
| 2019/0191424 A1* | 6/2019 | Wang | H04W 92/18 |
| 2020/0252180 A1* | 8/2020 | Takeda | H04W 72/04 |
| 2020/0260474 A1* | 8/2020 | Shapin | H04W 72/0446 |

FOREIGN PATENT DOCUMENTS

| | | | |
|---|---|---|---|
| WO | 2016/060809 A1 | 4/2016 | |
| WO | 2016/096007 A1 | 6/2016 | |
| WO | WO-2016096007 A1 * | 6/2016 | ........ H04W 72/1268 |
| WO | 2017/172937 A1 | 10/2017 | |
| WO | 2018/171532 A1 | 9/2018 | |
| WO | 2018/200748 A1 | 11/2018 | |
| WO | 2019/032844 A1 | 2/2019 | |

OTHER PUBLICATIONS

"On eMMB and URLL Multiplexing", Fujitsu, 3GPP TSG RAN WG1 Meeting #91, R1-1719616, Dec. 1, 2017.

Vivo, "Remaining issues on multiplexing data with different transmission durations", 3GPP Draft, RI-1719798, Nov. 18, 2017.

Intel, "Handling UL transmissions with different reliability requirements", 3GPP Draft, RI-1802424, Feb. 17, 2018.

Vivo, "Multiplexing data with different transmission durations", 3GPP TSG RAN WG1 Meeting NR#3, R1-1715646, Sep. 21, 2017.

Vivo, "Summary of multiplexing data with different transmission durations", 3GPP TSG RAN WG1 Meeting 91, R1-1721491, Dec. 1, 2017.

MediaTek Inc., "On UL multiplexing of transmissions with different reliability targets", 3GPP TSG RAN1 WG1 Meeting #92, R1-1801674, Mar. 2, 2018.

* cited by examiner

RESOURCE ALLOCATION FOR USER EQUIPMENT

CROSS-REFERENCE TO RELATED APPLICATIONS

This application is a National Stage of International patent application PCT/CN2019/079057, filed on Mar. 21, 2019, which claims priority to foreign Great Britain patent application No. GB 1805249.8, filed on Mar. 29, 2018, the disclosures of which are incorporated by reference in their entirety.

TECHNICAL FIELD

The following disclosure relates to the allocation of resources for uplink transmission, and in particular the sharing of resources between multiple mobile devices.

BACKGROUND

Wireless communication systems, such as the third-generation (3G) of mobile telephone standards and technology are well known. Such 3G standards and technology have been developed by the Third Generation Partnership Project (3GPP). The $3^{rd}$ generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

A trend in wireless communications is towards the provision of lower latency and higher reliability channels. For example, NR is intended to support Ultra-reliable and low-latency communications (URLLC). A user-plane latency of 1 ms has been proposed with a reliability of 99.99999%). In contrast to URLLC services, enhanced mobile broadband (eMBB) services aim to provide high data throughput, but potentially with less stringent latency requirements.

Sharing radio resources between URLLC and eMBB can create conflicts as eMBB benefits from allocation of large portions of resources scheduled early, whereas URLLC requires small portions of resources, but scheduled at short notice and unpredictably. Sharing uplink resources is particularly challenging when seeking to meet latency requirements for URLLC and also make efficient use of those resources. Allocating resources in all slots for the transmission of URLLC services minimises latency, but is also inefficient due to the infrequency and unpredictability of URLLC data transmission. Similarly, late allocation of resources for URLLC services may reduce the available resources due to earlier allocation of resources to eMBB services. Conflicts between transmissions can lead to loss of one or both transmissions and should therefore be avoided.

Communications over the physical wireless link are defined by a number channels, for example the Physical Downlink Control Channel (PDCCH) which is used to transmit control information, in particular Downlink Control Information (DCI), which defines how data will be transmitted to the UE over the Physical Downlink Shared Channel (PDSCH). Successful reception of data at a UE requires the reception and decoding of the PDCCH and the PDSCH channels.

The DCI is a specific message defined for NR in TS 38.212 and is carried on the PDCCH channel. As defined in Section 7.3 of TS 38.212 DCI transports downlink and uplink scheduling information, requests for aperiodic CQI reports, or uplink power control commands for one cell and one RNTI.

The present invention is seeking to solve at least some of the outstanding problems in this domain.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of allocating uplink resources in a wireless cellular communication network; the method comprising the steps of transmitting an indication from a base station to a first UE indicating grant of a first set of resources for an uplink transmission, subsequently receiving a scheduling request for an uplink transmission at the base station from a second UE, transmitting an indication from the base station to the second UE indicating grant of a second set of resources for the second UE's uplink transmission, wherein the second set of resources overlaps with the first set of resources, and transmitting a DCI in format 2_1 including a suspension indication from the base station to the first UE indicating resources of the first set of resources that are no longer available for the first UE's uplink transmission, wherein the payload of the DCI includes an explicit indication of uplink suspension.

The first UE may determine that the DCI includes a suspension indication for uplink resources based on the DCI payload upon decoding the DCI.

There is also provided a method of allocating uplink resources in a wireless cellular communication network; the method comprising the steps of transmitting an indication from a base station to a first UE indicating grant of a first set of resources for an uplink transmission, subsequently receiving a scheduling request for an uplink transmission at the base station from a second UE, transmitting an indication from the base station to the second UE indicating grant of a second set of resources for the second UE's uplink transmission, wherein the second set of resources overlaps with the first set of resources, and transmitting a DCI in format 2_1 including a suspension indication from the base station to the first UE indicating resources of the first set of resources that are no longer available for the first UE's uplink transmission, wherein the CRC of the DCI is scrambled utilising a RNTI allocated specifically for uplink suspension indications.

The first UE may determine that the DCI includes a suspension indication for uplink resources based on the RNTI utilised to scramble the CRC.

There is also provided a method of allocating uplink resources in a wireless cellular communication network; the method performed at a base station and comprising the steps of transmitting an RRC signal indicating a UE should monitor for DCI on a mini-slot basis and/or on a search space predefined for receiving a DCI including a suspension indication; transmitting an indication from a base station to the first UE indicating grant of a first set of resources for an uplink transmission, subsequently receiving a scheduling request for an uplink transmission from a second UE, transmitting an indication to the second UE indicating grant of a second set of resources for the second UE's uplink transmission, wherein the second set of resources overlaps with the first set of resources, and transmitting a DCI in format 2_1 including a suspension indication to the first UE indicating resources of the first set of resources that are no longer available for the first UE's uplink transmission.

When configured to monitor for DCI on a mini-slot basis and/or on a predefined search space, the first UE may decode all DCIs in format 2_1 on an assumption they include a suspension indication.

The indication that the UE should monitor for DCI on a mini-slot basis may include a monitoring periodicity, and wherein upon receipt of the suspension indication the first UE may determine a reference time period based on the monitoring periodicity, the reference time period being utilised to interpret the suspension indication.

Upon receipt of the suspension indication the first UE may suspend or maintain transmissions during the slot containing the second set of resources.

Upon receipt of the suspension indication the first UE may suspend transmission on the second set of resources.

Upon receipt of the suspension indication the first UE may suspend transmissions on frequency resources in the second set of resources, and between the start of the respective slot and the end of second set of resources, or between the start of the second set of resources and the end of the respective slot, whichever is shorter.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
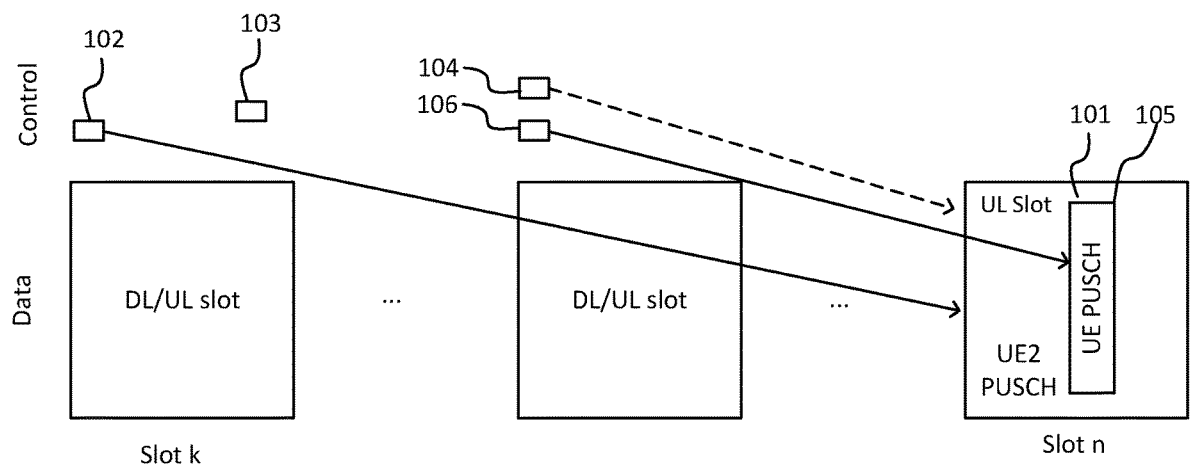
FIG. 1 shows control and data transmission.

FIG. 1 shows an example of scheduling uplink resources for two UEs. UE1 is utilising a URLLC service, and UE2 is utilising an eMBB service (in which the principle service requirement is capacity).

At, slot k, the base station allocates all uplink resources 101 in slot n for use by UE2 and transmits an indication of these resources to UE2 in a DCI 102. Later in slot k UE1 transmits a scheduling request (SR) 103 to the base station requesting uplink resources for a URLLC service. In order to comply with the latency requirements of URLLC resources are required to slot n, but those resources have already been allocated to UE2.

The base station thus transmits a suspension indication 104 to UE2 indicating resources 105 which are no longer available to UE2, and transmits an uplink grant indication 106 to UE1 allocating resources 105 to UE1. Upon receipt of the suspension indication 104 UE2 modifies its transmissions, as discussed below, during slot n such that the resources 105 are not utilised. The capacity available for UE2 is thus reduced somewhat, but the latency requirements for the URLLC service are able to be met.

The suspension indication may be transmitted to UE2 utilising a DCI message. In a particular example, DCI Format 2_1 as defined in TS 38.212 may be utilised. An appropriate mechanism is required to ensure the recipient and purpose of the indication can be determined, while ensuring efficient utilisation is made of control resources.

The opportunities for transmission and receipt of the suspension indication 104 are limited by the situation in which it is utilised. The suspension indication can only be transmitted once the SR 103 is received from the first UE, and must be transmitted early enough that the second UE can process the suspension indication 104 before commencing transmissions in the relevant slot. Furthermore, UEs only monitor for DCI at pre-defined opportunities in order to conserve power consumption.

Monitoring periodicity for downlink pre-emption indication is defined in TS 38.331 and uses a 2-bit RRC configuration. However, only three possible values are utilised:

|  | PI periodicity [slots] | RDR size [os] | M, N | Time resolution [os] |
| --- | --- | --- | --- | --- |
| Agreed values | 1 | 14 | {14, 1} | 1 |
|  |  |  | {7, 2} | 2 |
|  | 2 | 28 | {14, 1} | 2 |
|  |  |  | {7, 2} | 4 |
|  | 4 | 56 | {14, 1} | 4 |
|  |  |  | {7, 2} | 8 |
| Spare | — | — | — | — |

To allow re-use of the parameter for uplink suspension indication, with increased periodicity due to the timing constraints, the spare entry may defined as follows:—

| | | | | |
|---|---|---|---|---|
| Spare = Mini-slot (msl7) | 7/14 | 7 | {14, 1} | 1 |
| | | | {7, 2} | 1 (doubled freq resolution) |

This allow re-use of the RRC parameter, does not add any control overhead, but permits an increased periodicity. Then new configuration specifies monitoring on a mini-slot, rather than a slot, level.

In order to allow identification of uplink suspension indications the UEs can monitor for a DCI with the CRC scrambled by a specific RNTI allocated for the purpose, for example a specific UL RNTI may be allocated (as opposed to INT-RNTI utilised for downlink pre-emption indication). The use of an additional RNTI increases monitoring complexity as an additional CRC check is required, but this is marginal. More generally, a different PDCCH resource, or scrambling of the DCI bits or CRC could be used to provide this indication to UE. Also, in case polar coding is used for the DCI, it could be possible to use implicit indication through a specific sequence scrambled with one or more reliable data bits of the polar code.

The RRC configuration may also be made more complex as an additional search space is required for the uplink suspension indication, there is additional DCI payload size configuration and a separate sequence may be defined for indicating, per UL serving cell, the position of the 14 bit INT values inside the DCI payload. It may be possible that some parameters are shared with other configurations, for example with downlink pre-emption indication configuration (for example, the attribute OPTIONAL may be added to the parameter configurations in the uplink case). For example, parameters such as timeFrequencySet, controlResourceSetId, and monitoringPeriodicity are related to the general UE configuration and the same settings can be utilised for, for example, the uplink suspension indication and downlink pre-emption indication.

However, utilising a specific RNTI allows separation of the uplink suspension indication from other messages such as downlink pre-emption indication, thus permitting different sets of UEs can be configured to monitor for different messages. For example, a set of UEs utilising eMBB-type services may be configured to monitor for the uplink suspension indication while a different set of UEs utilising eMBB-type services may be configured to monitor for the downlink preemption indication, since those UEs are likely to be required to modify their transmissions due to a conflicting URLLC transmission.

The use of a DCI message for uplink suspension indication may be indicated implicitly when a UE is configured with mini-slot monitoring (for example the additional setting disclosed hereinbefore). Upon such configuration being received a UE may assume that DCI messages in the specified format (for example 2_1) relate to uplink suspension indications. As noted above a separate sequence may be defined to indicate, per uplink serving cell, the position of the 14 bit INT values in the DCI payload.

Such an implicit indication, however, utilises relative slow RRC signalling thus limiting opportunities to reconfigure behaviour. In the above example the UE assumes all DCI are uplink suspension indications, and the UE is thus unable to receive a downlink pre-emption indication which uses the same DCI format.

However, different types of message may be distinguished by other characteristics. For example, only downlink indications may be sent at the beginning of a slot, and only uplink indications in the middle of a slot. Alternatively, different search spaces may be configured for messages related to the downlink and uplink, but optionally with common configuration for RNTI and other parameters. For example downlink indications may be carried in a search space with slot-level periodicity, and uplink indications in a search space with mini-slot periodicity.

A further option is to provide an explicit indication in the DCI. To avoid increasing the control overhead an unused bit may be utilised. For example, in DCI format 2_1, a 14-bit bitmap may be utilised to indicate suspension of the uplink, and pre-emption in the downlink. 7 bits may be sufficient to indicate the length of suspension, with one of the unrequired bits being utilised to indicated whether the value applies to the uplink or downlink. As another example, consider X number of serving cells configured for preemption or suspension indication, a DCI format 2_1 total size Y bigger than X*14 bits be configured, e.g. in order to align the size of several DCI formats. One of the extra (Y−X*14) unrequired bits may be utilised to indicate whether the DCI regards an uplink suspension or a downlink pre-emption. In general, any unused bit in a DCI may be utilised to indicate whether the message relates to uplink or downlink. Furthermore, if no unused bits are available, an additional bit, e.g. in the form of an additional 1-bit field Format Indicator in the DCI format 2_1, may be added to the message, but this increases the control overhead.

As set out above the uplink suspension indication indicates previously scheduled resources which are no longer available for use. Upon receipt of the indication the UE must modify its transmission to avoid interference with other transmissions now allocated to those resources.

The simplest approach is to suspend the whole transmission using the resources, but this leads to a significant performance degradation. It is also possible to utilise power control in an effort to transmit both transmissions on the same resources, however this may cause inter-cell interference, cell coverage reduction, and requires complex base station receivers to be able to recover both transmissions.

The UE may also stop transmissions during the specified resources, but transmit on all other resources as planned. The base station may be able to decode the transmissions, despite the lost resource elements. If code-book group transmission is on the base station will only ask for retransmission of the non-decoded groups, thereby minimising retransmission resources. Similarly, if code-book group transmission is off, and/or decoding of the whole transmission is unsuccessful the received signals may be utilised in a soft combination with a retransmission or repetition to improve transmission performance.

Figure 2:
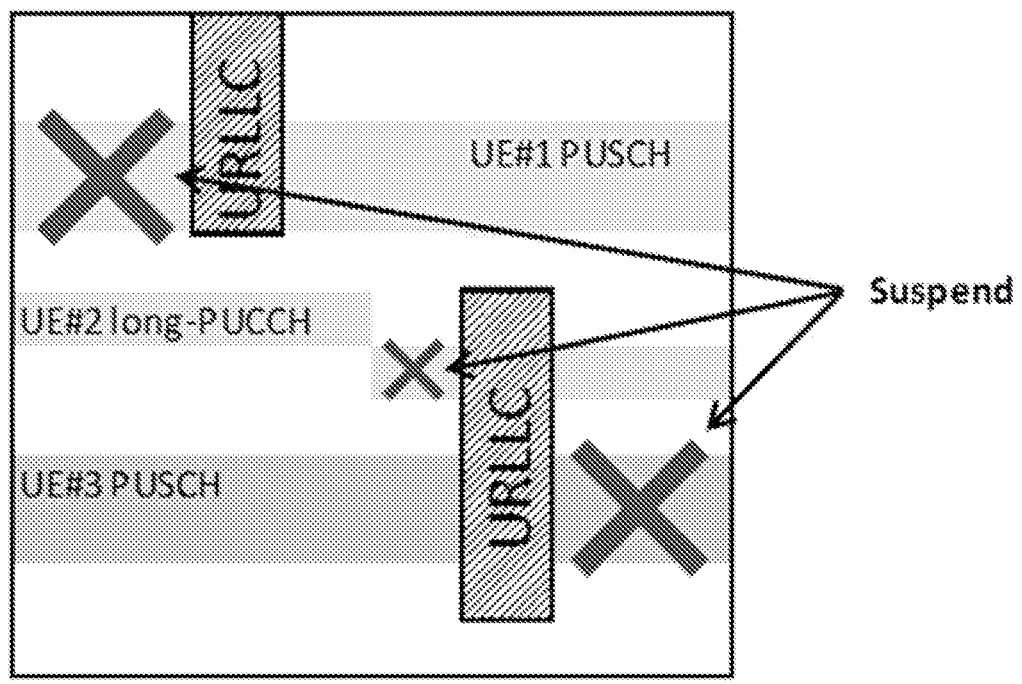
FIG. 2 shows data transmission.

FIG. 2 shows an example in which a selected part of a transmission is suspended. In particular, the largest part of the transmission around the unavailable resources is transmitted, but the overlapping and smaller parts are not transmitted, thus reducing energy consumption. In the example of FIG. 2 the re-allocated resources are utilised by a different UE making a URLLC transmission, and the longer part of overlapping transmissions is made as planned. The base station may utilise received signals in soft combination with later repetitions or retransmissions. This technique can be improved by the base station scheduling URLLC transmissions near or at the start/end of slots to minimise the resources that are not available.

A UE may also re-encode data around the unavailable resources. For example, a smaller transport block may be encoded, or the same transport may be transmitted but rate-matched around the unavailable resources. Sufficient channel quality and time to re-encode are required for this approach however. Such an approach may present processing and latency challenges.

Also, instead of indicating the suspension of transmission, uplink suspension indication may be used reversely to indicate suspension when not received while upon receipt from second UE its transmission can occur as scheduled. That requires that suspension indication is only not transmitted if a scheduling request from second UE is received at base station after the first UE transmission has been scheduled. For example, if suspension indication is detected, first UE may continue its transmission; otherwise UE mutes its transmission within the slot. In another example if suspension indication is decoded and its bitmap indicates no suspension (e.g. all bits are zero), first UE continues its scheduled transmission; otherwise UE mutes the whole or part of its transmission within the slot. Such an approach may present an advantage on the reliable transmission of the first UE scheduled resources since a missed detection or decoding of suspension indication will not lead into collision between transmissions of the two UEs.

Figure 3:
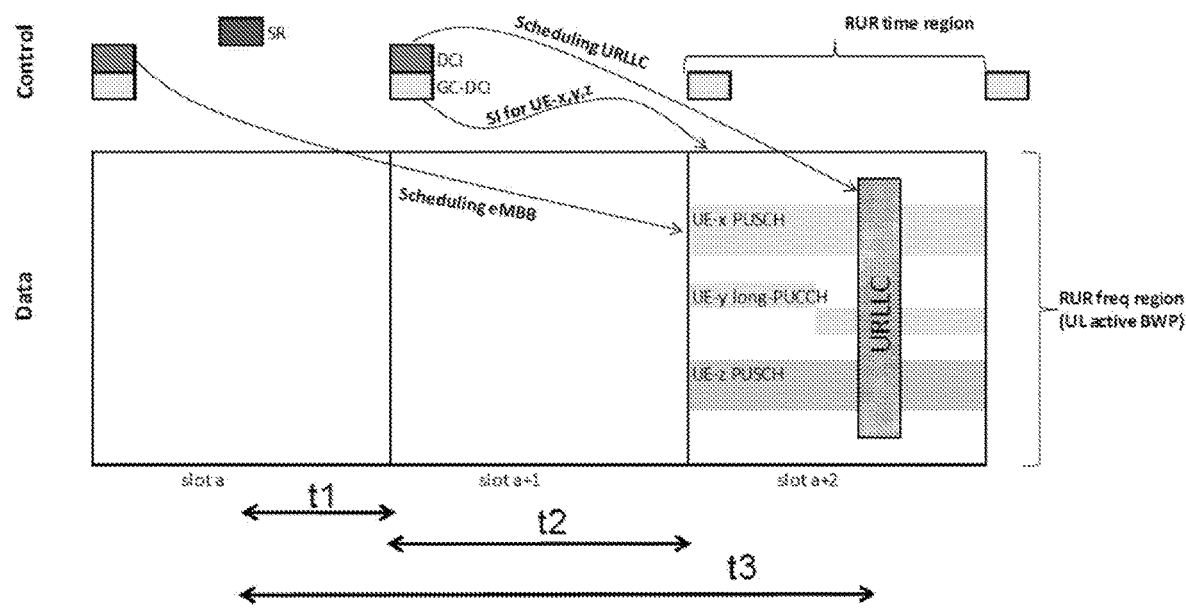
FIGS. 3 and 4 show examples of reference uplink resource determination.

The suspension indication may be interpreted with respect to a Reference Uplink Resource (RUR). The RUR may be determined according to the following rules, and as shown in FIG. 3 for a 1-slot SI monitoring periodicity:—
The frequency region of the reference uplink resource for pre-emption indication is the active UL BWP
When a SI is detected, the time location of the corresponding RUR is determined by:
FDD case:—
The RUR starts at the $1^{st}$ symbol the of the next CORESET for SI monitoring, and
ends right before the second next CORESET for SI monitoring.
TDD case:—
The RUR starts at the $n^{th}$ symbol the after the current CORESET for SI monitoring (excluding DL slots, where n is the SI periodicity), and
ends right before the next CORESET for SI monitoring after the starting point.

The aforementioned RUR time determination covers the case where the uplink suspension indication is received at the UE resources to be interrupted before its transmission started. In case the uplink suspension indication is received after the UE transmission is started, time determination for RUR will be analogous to the RDR definition.

Figure 4:
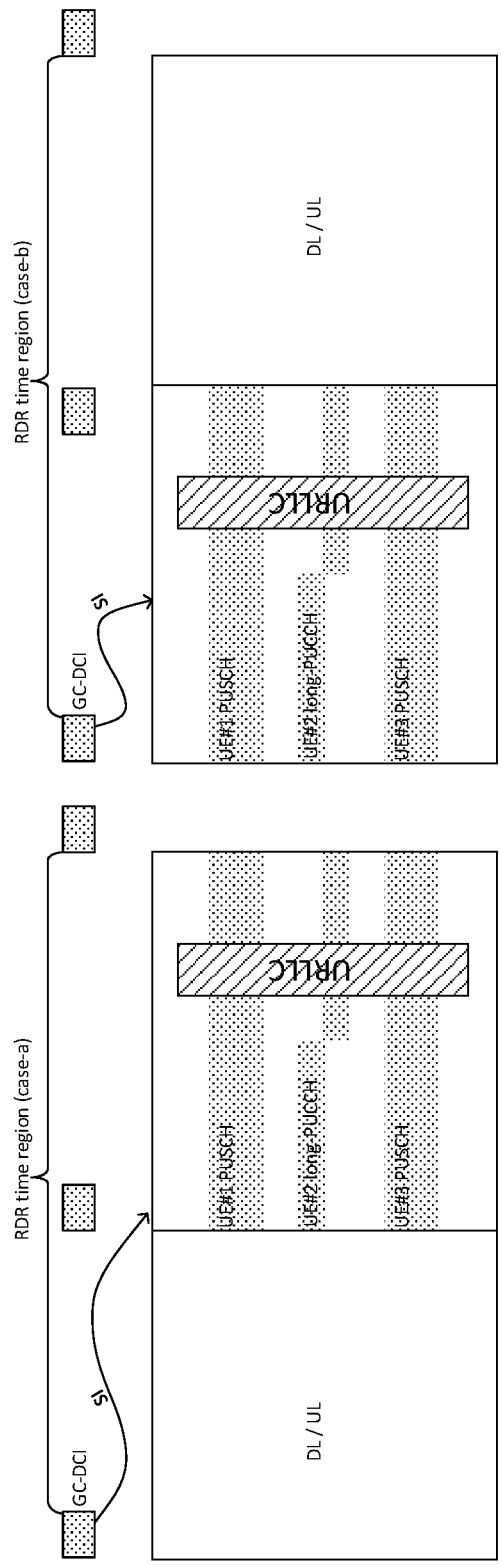

However, there has to be found a way to commonly determine the RUR for both cases: a) SI received after UE transmission has started, b) before UE transmission has started. For this reason, the SI reference time should cover the duration of 2*SI_monitoring_periodicity to cover both cases as shown in FIG. 4.

When a suspension indication is detected, the time location of the corresponding RUR is determined by:
The RUR starts at the $1^{st}$ symbol the of the current CORESET for SI monitoring. and
ends right before the second next CORESET for SI monitoring.
That is the referenced time determination is based on the duration of 2*SI_monitoring_periodicity.

Generally, search space is defined as a resource space where UE-specific, GC (Group common)- or Common-DCI can be transmitted by gNB and blindly decoded (searched) by UE. The official definition is: "A PDCCH search space at CCE AL L is defined by a set of PDCCH candidates for this CCE AL." where:—
The physical downlink control channel (PDCCH) is a physical channel that carries downlink control information (DCI).
A PDCCH consists of one or more CCEs (e.g. L∈{1, 2, 4, 8}). This number is defined as the CCE aggregation level (AL).
For PDCCH blind decoding, the set of ALs and the number of PDCCH candidates per CCE AL per DCI format size that the UE monitors can be configured The invention has been described with respect to the examples and scenarios mentioned above. However, the invention may also apply to other situations and scenarios, such as for example, indication existence of very small packets of, e.g., gaming or remote control, services transmitted in similar way as pre-empting ongoing transmissions.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of allocating uplink resources in a wireless cellular communication network; the method comprising the steps of:

transmitting an indication from a base station to a User Equipment (UE) indicating grant of a set of resources for an uplink transmission, and subsequently transmitting a Downlink Control Information (DCI) including a suspension indication comprising a 7 or 14 bit bitmap from the base station to the UE indicating a subset of the set of resources granted for an uplink transmission that are no longer available for the UE's uplink transmission, wherein a Cyclic Redundancy Check (CRC) of the DCI is scrambled utilizing a Radio Network Temporary Identifier (RNTI) allocated specifically for uplink suspension indications for the UE to determine that the DCI includes the suspension indication for uplink resources based on the RNTI utilized to scramble the CRC.

2. The method according to claim 1, further comprising transmitting a Radio Resource Control (RRC) message to configure a DCI payload size configuration, the message including a separate sequence to indicate, per UL serving cell, a position of Interruption (INT) values inside a DCI payload.

3. The method according to claim 1, wherein the suspension indication is interpreted with respect to a reference resource which frequency region is an active Bandwidth Parts (BWP).

4. The method of claim 1, wherein if the suspension indication does not indicate no suspension, the UE mutes the whole or part of its transmission.

* * * * *